Oct. 27, 1953
F. T. BLACKMAN
2,657,082
KEYING DEVICE
Filed April 6, 1950
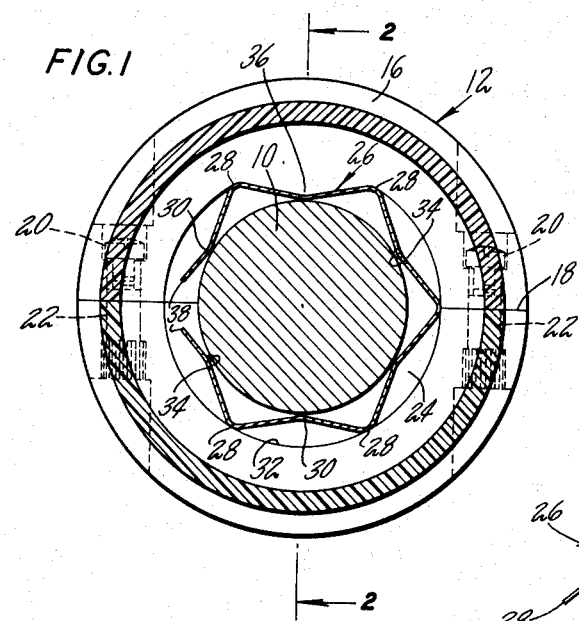
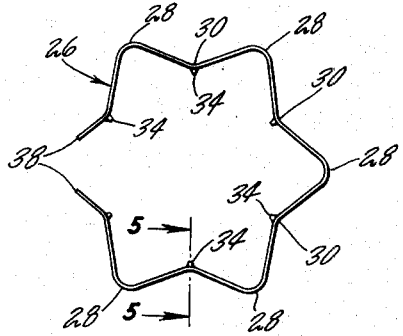
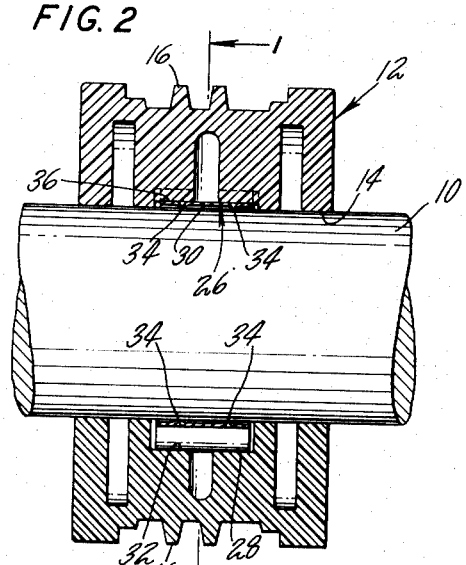
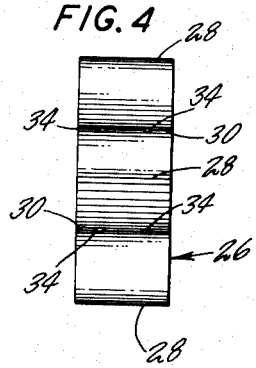
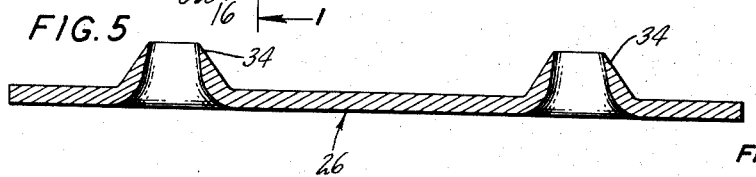
INVENTOR
FRED T. BLACKMAN
BY Lindsay, Pratzman and Jack
ATTORNEYS Patented Oct. 27, 1953

2,657,082

UNITED STATES PATENT OFFICE 2,657,082

KEYING DEVICE

Fred T. Blackman, Newington, Conn., assignor to Veeder-Root, Inc., Hartford, Conn., a corporation of Connecticut Application April 6, 1950, Serial No. 154,327

2 Claims. (Cl. 287—52.04)

1

This invention relates to improvements in keying devices and, more particularly, to a keying device which is self-operable to lock, for example, a power transmitting member to a drive shaft so as to prevent relative rotation therebetween.

The object of the present invention is to provide a simple, self-operating and inexpensively manufactured keying device which may be mounted between a cylindrical shaft and a member to be locked against relative rotation to said shaft, said keying device preferably scoring said shaft incident to the member being assembled onto the shaft.

It is another object of the invention to provide a simple keying device which may be used to lock a member to a cylindrical shaft, said keying device being of such nature as to readily adapt itself to being used relative to shafts having different diameters within a reasonable range.

It is a further object of the invention to provide a simple keying device for locking a member against rotation relative to a cylindrical shaft, said keying device being formed by inexpensive machine operations from readily available material such as spring steel strip stock.

Details of the foregoing objects and of the invention, as well as other objects thereof, are set forth in the following specification and illustrated in the accompanying drawing forming a part thereof.

In the drawing:

Fig. 1 is a transverse sectional view through a shaft and a member keyed thereto by means embodying the present invention, said view being taken on line 1—1 of Fig. 2.

Fig. 2 is a longitudinal sectional view taken on line 2—2 of Fig. 1.

Fig. 3 is a plan view of a keying device embodying the present invention.

Fig. 4 is a side elevation of the keying device shown in Fig. 3.

Fig. 5 is an enlarged sectional view of a detail of the present invention taken on line 5—5 of Fig. 3.

Referring to the drawing, in which like numerals are used to indicate like parts illustrated therein, there is shown an exemplary shaft 10 which may be any kind of a cylindrical shaft used for purposes of transmitting power or otherwise. Said shaft may be formed from any convenient material such as steel shafting used for transmitting power in various kinds of machinery such as a loom, for example. There is also illustrated an exemplary power transmitting member 12 which surrounds the shaft 10, said member

2 having a central aperture 14 extending therethrough and having a diameter similar to that of the shaft 10. For example, the member 12 may comprise a separable worm having threads 16, said worm being split along a plane 18 extending through the axis of the shaft 10. The parts of the separable member 12 may be connected together by any suitable means such as bolts 20 threaded into inserts 22. By way of further example, the parts of the member 12 may be suitably formed by molding the same from synthetic resinous material and the inserts 22 may be molded in situ within one of the parts of the member 12.

The member 12 is also provided with an internal annular recess 24 which is disposed adjacent the shaft 10 when the member 12 is in operative position relative to the shaft.

The keying device 26 comprising the present invention is substantially C-shaped, as shown in Figs. 1 and 3, and consists of a strip of resilient metal, such as spring steel, relatively short sections of which are bent substantially throughout the length thereof in opposite directions to provide a series of crests 28 and 30 which respectively and alternately extend in opposite directions away from and toward the shaft 10 when the keying device is disposed thereon. The C-shaped formation of the keying device 26 permits the same to be snapped around the shaft 10 when being assembled thereto and the parts of the member 12 are then placed over the keying device 26 so that the latter is received within the annular recess 24 formed in the interior of the member 12.

When the bolts 20 are being tightened into place to fasten the two parts of the member 12 into operative engagement with each other around the shaft 10, the inner wall 32 of recess 24 will contact the outwardly directed crests 28 of the keying device 26 in such manner as to compress them toward the shaft 10 and thereby bias the inwardly directed crests 30 of said keying device toward the shaft 10. The natural resilience of the keying device 26 will cause said outwardly directed crests 28, through their engagement with the inner wall 32 of the recess 24, to exert appreciable force in biasing said inwardly directed crests 30 toward said shaft.

The inwardly directed crests 30 of the keying device are preferably each provided with a plurality of pairs of transversely aligned sharp-edged projections 34 which extend radially inward from the crests 30 toward the center of the keying device 26, as is clearly illustrated in Figs.

1 through 3. Said sharp-edged projections 34 comprise keying members which, due to the hardness of the material from which the keying device 26 is formed, will bite into and score the surface of the shaft 10 when the same are compressed against said shaft incident to the connection of the two parts of the member 12 to each other around shaft 10 by the bolts 20. The projections 34 may be formed by any suitable means such as piercing the strip of material from which the keying device 26 is fabricated, said piercing preferably being done in conjunction with a die so as to provide all of the projections 34 with a substantially uniform shape. It will be seen from the foregoing that the scoring engagement of the projections 34 with the shaft 10 will serve to prevent rotatable movement between the keying device 26 and said shaft.

From Figs. 1 and 3, it will be seen that the outwardly directed crests 28 define between each pair of such crests a substantially V-shaped space on the outer surface of the keying device 26. One part of the member 12 is provided with a V-shaped projection 36 which is substantially complementary in shape to said V-shaped space between adjacent crests 28 of the keying device and said projection 36 is selectively disposable within one of said spaces for purposes of preventing rotatable movement between the member 12 and the keying device 26. Projection 36 extends towards shaft 10 from the inner wall 32 of the recess 24 in member 12 and may be formed by molding at the time the part of member 12 which contains said projection is molded.

It will thus be seen that inasmuch as projection 36 engages the keying device 26 so as to prevent relative rotation therebetween and projections 34 engage the outer surface of shaft 10 in scoring relationship so as to prevent relative rotation between said shaft and the keying device, any noticeable rotatable movement between shaft 10 and member 12 is effectively prevented. Under most circumstances, the ends 38 of keying device 26 will be spaced apart when in operative keying position as shown in Fig. 1. Such spacing permits the use of said device with shafts of different diameters within a reasonable range, as aforesaid.

It will also be seen that the keying devices 26 may be inexpensively formed by simple machine operations from readily available material such as spring steel strip stock. The shape and nature of the keying device 26 is also such that it may be used for keying purposes, as described above, relative to shafts having different diameters within a reasonable range, whereby only a relatively few different sizes of such keying devices will be required for purposes of keying members to shafts of a very substantial range of different diameters. Further, from the nature of the manner in which the keying device is mounted between a shaft and a member being keyed thereby to the shaft, it will be seen that the keying device is self-locking relative to the shaft and member.

While the invention has been illustrated and described in its preferred embodiments and has included certain details, it should be understood that the invention is not to be limited to the precise details herein illustrated and described since the same may be carried out in other ways, falling within the scope of the invention as claimed.

I claim as my invention:

1. A device for keying a member to a cylindrical shaft and comprising a relatively thin, resilient metallic strip bent in opposite directions substantially throughout its length to provide a series of crests alternately extending in opposite directions and which crests are connected by adjacent strip sections disposed at an angle relative to each other, said strip also being bent generally throughout its length into a C-shaped configuration and arranged to be snapped around said shaft and disposed within said member, and a sharp-edged projection extending inwardly from each inwardly directed crest of said strip and engageable in scoring relationship with said shaft, the spaces between the outwardly directed crests being arranged selectively to receive a projection on said member and lock said strip against rotative movement relative thereto.

2. In combination with a cylindrical shaft and a separable member having an aperture for receiving said shaft in close fitting relation and an internal annular recess adjacent said shaft, a generally C-shaped resilient metallic strip extending around said shaft and bent in opposite directions substantially throughout its length to provide a series of crests alternately extending in opposite directions toward and away from said shaft, the outwardly directed crests of said strip engaging the inner wall of said annular recess within said member and being compressed thereby to bias the inwardly directed crests of said strip toward said shaft, a sharp-edged projection extending inward from each inwardly directed crest of said strip and engageable in scoring relationship with said shaft to key said strip against movement relative thereto, the portions of said strip between said outwardly directed crests defining a plurality of V-shaped spaces, and a V-shaped projection complementary to said V-shaped spaces and extending from the inner wall of said annular recess in said member toward said shaft and selectively disposable within one of said V-shaped spaces to lock said member against rotative movement relative to said strip.

FRED T. BLACKMAN.

References Cited in the file of this patent

UNITED STATES PATENTS

| Number | Name | Date |
| --- | --- | --- |
| 832,015 | Frazee | Sept. 25, 1906 |
| 1,817,772 | Sipe | Aug. 4, 1931 |
| 2,190,577 | Tinnerman | Feb. 13, 1940 |
| 2,256,419 | Tinnerman | Sept. 16, 1941 |
| 2,283,905 | Beal | May 26, 1942 |